United States Patent
Seo et al.

(10) Patent No.: US 11,230,038 B2
(45) Date of Patent: Jan. 25, 2022

(54) INJECTION MOLDING APPARATUS FOR INSERTING ATYPICAL STIFFENER

(71) Applicants: Hyundai Motor Company, Seoul (KR); Automobile Industrial ACE, Ansan-si (KR); Kia Motors Corporation, Seoul (KR)

(72) Inventors: Yong Goan Seo, Incheon (KR); Hyun Kyung Kim, Hwaseong-si (KR); Byungkyu Yoon, Uiwang-si (KR); Do Jung Choi, Hwaseong-si (KR); Bo Young Choi, Gunpo-si (KR); Taegbong Cho, Incheon (KR)

(73) Assignees: Hyundai Motor Company, Seoul (KR); Automobile Industrial ACE, Ansan-si (KR); Kia Motors Corporation, Seoul (KR)

( * ) Notice: Subject to any disclaimer, the term of this patent is extended or adjusted under 35 U.S.C. 154(b) by 381 days.

(21) Appl. No.: 16/297,318

(22) Filed: Mar. 8, 2019

(65) Prior Publication Data

US 2019/0275715 A1   Sep. 12, 2019

(30) Foreign Application Priority Data

Mar. 8, 2018   (KR) .................. 10-2018-0027454

(51) Int. Cl.
*B29C 45/14*   (2006.01)
*B29C 45/26*   (2006.01)
(Continued)

(52) U.S. Cl.
CPC .... *B29C 45/14065* (2013.01); *B29C 45/0408* (2013.01); *B29C 45/26* (2013.01);
(Continued)

(58) Field of Classification Search
CPC .... B29C 2045/14098; B29C 45/14065; B29C 45/14262; B29C 2045/14163; B29C 2045/14122
See application file for complete search history.

(56) References Cited

FOREIGN PATENT DOCUMENTS

| JP | 2011-005738 A | 1/2011 |
|----|---|---|
| JP | 2011-25554 A | 2/2011 |

(Continued)

OTHER PUBLICATIONS

Jp2011005738 machine translation (Year: 2011).*

*Primary Examiner* — Timothy Kennedy
*Assistant Examiner* — Alexander A Wang
(74) *Attorney, Agent, or Firm* — Morgan, Lewis & Bockius LLP

(57) ABSTRACT

An injection molding apparatus for inserting atypical stiffener including an upper mold provided with an upper core and an under mold provided with an under core for manufacturing an injection molding product by receiving synthetic resin melt and curing in a state in which an atypical stiffener whose size is not constant is inserted, may include elastic clampers supported by the under mold, embedded in the under core, interlocked with the size of the atypical stiffener, and elastically pressurizing both sides to hold the atypical stiffener to be inserted into a correct position between the upper core and the under core by the atypical stiffener when the synthetic resin melt is introduced.

4 Claims, 16 Drawing Sheets

(51) Int. Cl.
  *B29C 45/04* (2006.01)
  *B29L 31/30* (2006.01)
(52) U.S. Cl.
  CPC ............... *B29C 2045/14098* (2013.01); *B29L 2031/3044* (2013.01)

(56) References Cited

FOREIGN PATENT DOCUMENTS

| | | | |
|---|---|---|---|
| JP | 2015-139947 | A | 8/2015 |
| KR | 10-1198621 | B1 | 11/2012 |
| KR | 10-2016-0062467 | A | 6/2016 |

\* cited by examiner

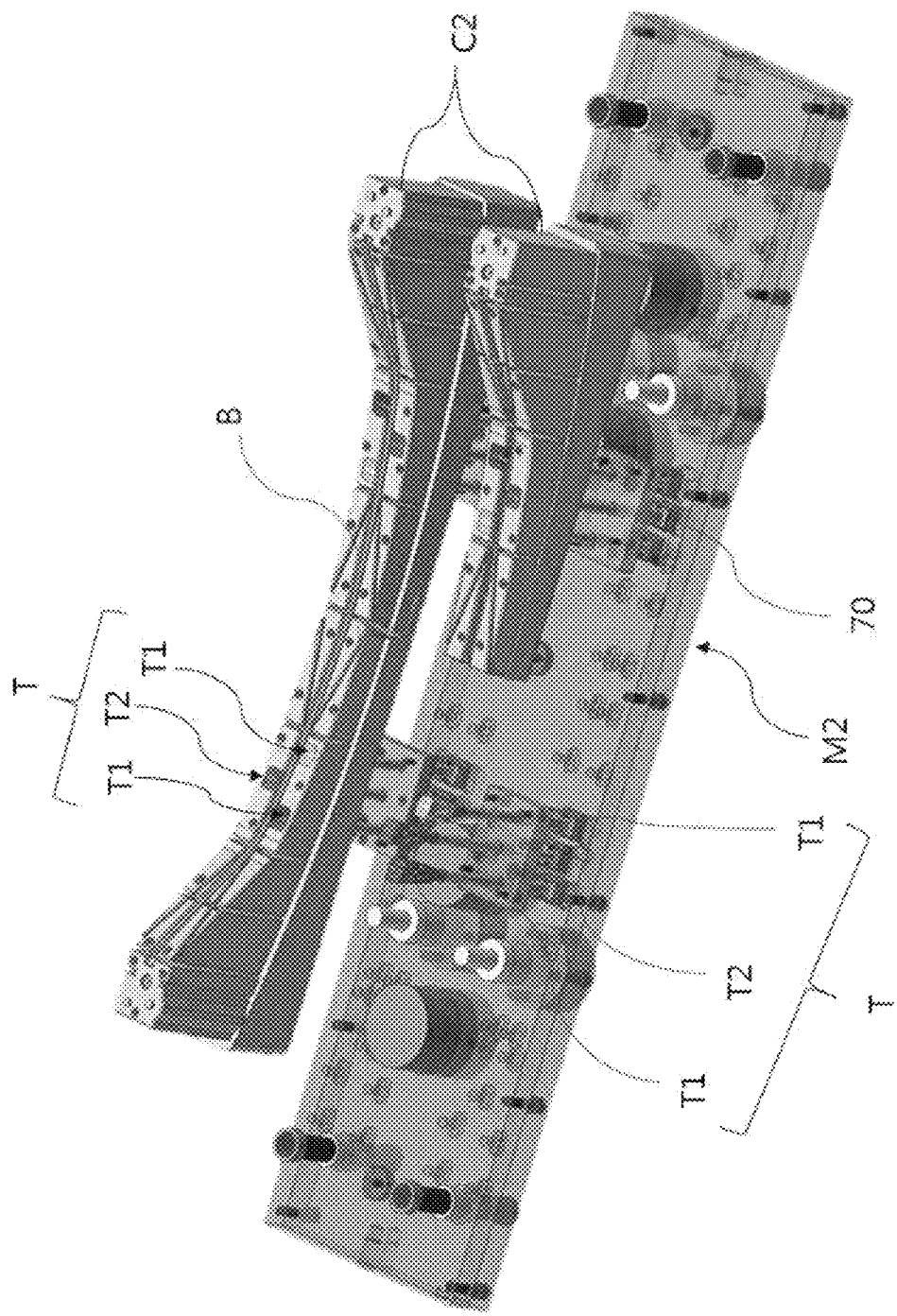

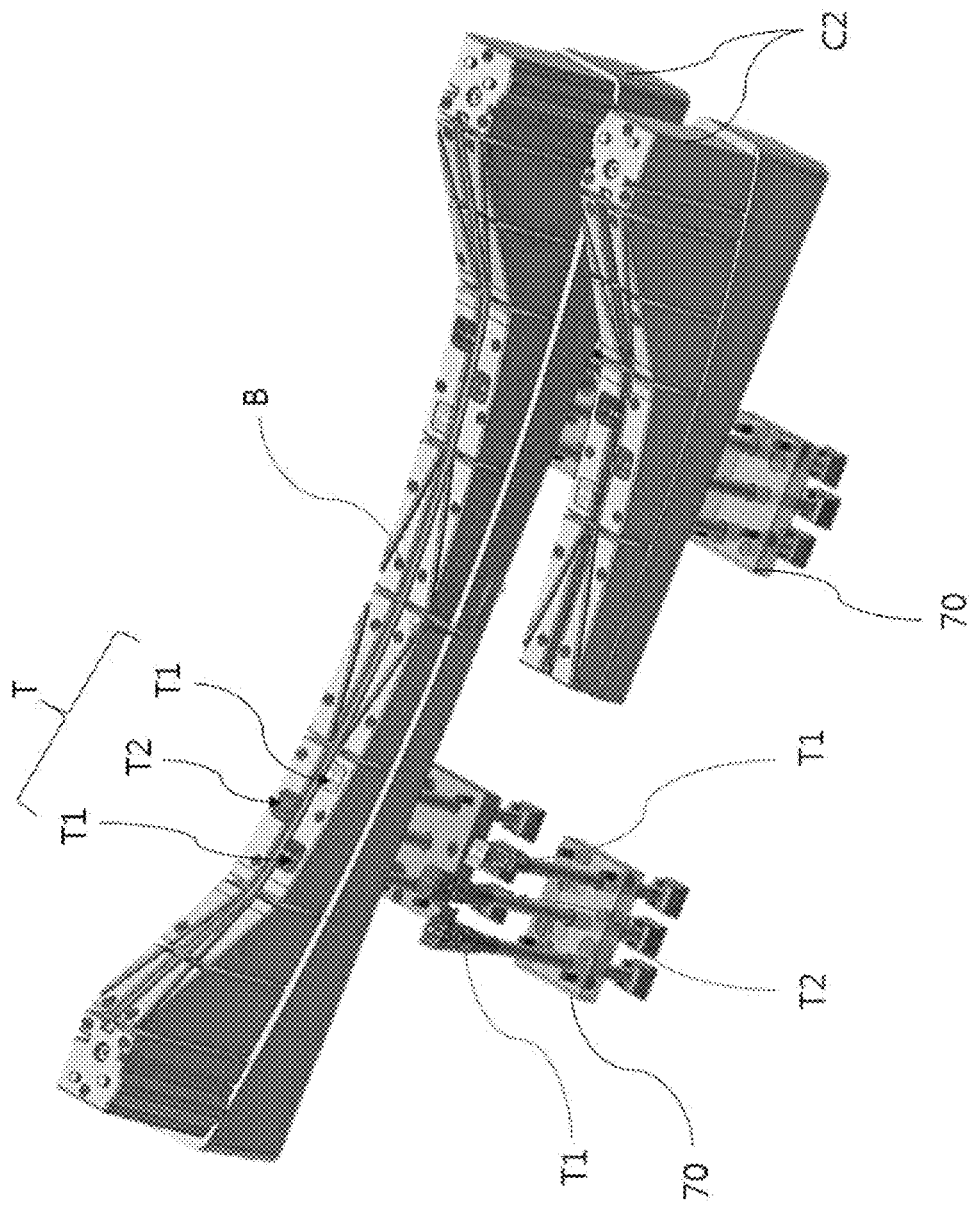

INJECTION MOLDING APPARATUS FOR INSERTING ATYPICAL STIFFENER

CROSS-REFERENCE TO RELATED APPLICATION

The present application claims priority to Korean Patent Application No. 10-2018-0027454 filed on Mar. 8, 2018, the entire contents of which is incorporated herein for all purposes by this reference.

BACKGROUND OF THE INVENTION

Field of the Invention

The present invention relates to an injection molding apparatus for inserting atypical stiffener. More particularly, the present invention relates to an injection molding apparatus for inserting atypical stiffener in which presses elastically both sides of the atypical stiffener B in association with the size of an atypical stiffener B to hold it in position between an upper core and an under core.

Description of Related Art

Generally, injection molding refers to manufacturing an injection molding product of a desired shape by injecting and hardening a melted synthetic resin melt mixed with a thermoplastic resin, a thermosetting resin, a binder or the like into a mold, and the injection molding product is used in various fields ranging from household appliances to smart phones, various building materials and vehicle parts.

If the injection molding product produced by injection molding of a synthetic resin material requires high strength, for example, to withstand impact, it is manufactured by inserting a stiffener.

An example of an injection molding product in which such a stiffener is inserted may be a bumper beam used as a vehicle parts.

FIG. 1A is an exploded perspective view showing a configuration of a conventional automotive bumper assembly introduced in the related art and FIG. 1B is a perspective view showing a plastic composite material bumper beam for a vehicle according to the related art document.

A typical automotive bumper assembly introduced in the related art may include a bumper cover 10 that encloses the entire front and rear of the vehicle body as shown in FIG. 1A, and an energy absorber 20 for absorbing the sluggishness and impact energy of the bumper cover 10, a bumper beam 30 positioned behind the energy absorber 20 for protecting the vehicle body from the impact and a stay 40 for fixing and supporting the bumper beam 30 to the vehicle.

At the instant time, when a stiffener 35 is inserted, the bumper beam 30 further strengthens the force that can withstand an external impact, protecting the vehicle body and assuring occupant safety.

Accordingly, the automotive plastic composite material bumper beam according to the related art document may include a body of a bumper beam 30 made of a fiber-reinforced plastic composite material and the stiffener 35 inserted into the body of the bumper beam 30, and the inserted stiffener 35 is disposed long along the longitudinal direction of the body of the bumper beam 30 with a loop shape as shown in FIG. 1B.

The stiffener 35 may be made of a material having a higher rigidity than that of the main material provided as the material of the main body of the bumper beam 30, for example, the stiffener 35 may be made of fiber reinforced plastic composites, glass fiber, natural fiber, carbon fiber, aramid fiber, ultra high molecular weight polyethylene fiber (UHMWPE Fiber), and the cross-sectional structure, thickness, shape, and the like may vary.

However, the plastic composite material bumper beam according to the related art does not describe what type of device the stiffener 35 is to be used when inserting the stiffener 35. There is no suggestion that, if the structure of the stiffener 35, the structure such as the thickness or the shape is various, and the structure is irregular, whether different apparatuses are required or whether different cores are used. As a result, it is predicted that each core or the like according to the sectional structure of the stiffener 35 or the thickness or shape of the stiffener 35 is used in the conventional technology, and the productivity is remarkably reduced due to mobilization of various facilities.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an injection molding apparatus configured for inserting atypical stiffener in which an elastic clamper presses elastically both sides of the atypical stiffener in association with the size of an atypical stiffener to hold it in position between an upper core and an under core (if the size is large, it retreats backward by elasticity, and if the size is small, it moves forward).

Various aspects of the present invention are directed to providing an injection molding apparatus configured for inserting atypical stiffener configured for securely and accurately holding correct position of the atypical stiffener inserted into the injection molding product by elastically pressing the atypical stiffener by one side elastic clamper and the other side elastic clamper from both sides even if the size of the atypical stiffener is different (even if the size of the atypical stiffener is uneven).

Various aspects of the present invention are directed to providing an injection molding apparatus configured for inserting atypical stiffener in which the vertical supporter and the horizontal elasticity bundle are mounted to make under mold and under core embedding easier when the one side elastic clamper and the other side elastic clamper are provided, a horizontal elastic bundle is mounted to the upper end portion of the vertical supporter while being supported by the under mold.

Various aspects of the present invention are directed to providing an injection molding apparatus configured for inserting atypical stiffener in which the horizontal elasticity bundle of the one side elastic clamper and the horizontal elasticity bundle of the other side elastic clamper can elastically press at the upper wide and the under narrow intervals on both sides of the atypical stiffener, whereby the synthetic resin melt is cured in the under mold and the upper mold, therefore it may be rapidly separated from the horizontal elastic bundle on both sides when it is removed in the upward direction thereof.

Various aspects of the present invention are directed to providing an injection molding apparatus configured for inserting atypical stiffener in which the vertical supporters of the one side elastic clamper and the other side elastic clamper are fixed close to the lower end portion of the under mold, respectively, and then are inserted into the inclination holes of the tilt bracket and are inclined at mutually different distances toward the upper end portion of the under mold, enables rigid support of the horizontal elastic bundle, therefore it is possible to insert an atypical stiffener without shaking at the time of mass production of the injection molding products.

Various aspects of the present invention are directed to providing an injection molding apparatus configured for inserting atypical stiffener in which elastic pins and springs and wrench bolts are used at all times in a fixed bundle to assure the ease of assembly through easy embedding into the under core, and, the elasticity of the spring supported by the wrench bolt coupled with the screw groove of the wide tunnel, and the elastic pins are fixed to the stopper by the limiting jaw so that the side surface of the atypical stiffener is flexibly pressurized.

Various aspects of the present invention are directed to providing an injection molding apparatus configured for inserting atypical stiffener configured for ensuring the smooth adhesion according to the size of the atypical stiffener.

Various aspects of the present invention are directed to providing an injection molding apparatus configured for inserting atypical stiffener in which the narrow rod and wide rod of the vertical supporter are inserted into the narrow vertical grooves and the wide vertical grooves of the fixed bundle, and the fixing pin is inserted into the internal horizontal hole via the external horizontal hole in a state where the support step is in contact with the fixing step, and the horizontal elasticity bundle is easily embedded in the under core, therefore ensuring robust assembly.

In various aspects of the present invention, an injection molding apparatus configured for inserting atypical stiffener including an upper mold M1 provided with an upper core C1 and an under mold M2 provided with an under core C2 for manufacturing an injection molding product S by receiving synthetic resin melt and curing in a state in which an atypical stiffener B whose size is not constant is inserted, includes elastic clampers T supported by the under mold M2, embedded in the under core C2, interlocked with the size of the atypical stiffener B, and elastically pressurizing both sides to hold the atypical stiffener B to be inserted into a correct position between the upper core C1 and the under core C2 by the atypical stiffener B when the synthetic resin melt is introduced.

The present invention is for elastically pressing both sides of an atypical stiffener by an elastic clamper in association with the size of an atypical stiffener to hold it in position between an upper core and an under core (if the size is large, it retreats backward by elasticity, and if the size is small, it moves forward).

The present invention is for securely and accurately holding correct position of the atypical stiffener inserted into the injection molding product by elastically pressing the atypical stiffener by one side elastic clamper and the other side elastic clamper from both sides even if the size of the atypical stiffener is different (even if the size of the atypical stiffener is uneven).

The present invention is for providing an injection molding apparatus configured for inserting atypical stiffener in which the vertical supporter and the horizontal elasticity bundle are mounted to make under mold and under core embedding easier when the one side elastic clamper and the other side elastic clamper are provided, a horizontal elastic bundle is mounted to the upper end portion of the vertical supporter while being supported by the under mold.

The present invention is for providing an injection molding apparatus configured for inserting atypical stiffener in which the horizontal elasticity bundle of the one side elastic clamper and the horizontal elasticity bundle of the other side elastic clamper may be elastically pressed at the upper wide and the under narrow clearances on both sides of the atypical stiffener, whereby the synthetic resin melt is cured in the under mold and the upper mold, therefore it may be rapidly separated from the horizontal elastic bundle on both sides when it is removed in the upward direction thereof.

The present invention is for providing an injection molding apparatus configured for inserting atypical stiffener in which the vertical supporters of the one side elastic clamper and the other side elastic clamper are fixed close to the lower end portion of the under mold, respectively, and then are inserted into the inclination holes of the tilt bracket and are inclined at mutually different distances toward the upper end portion of the under mold, enables rigid support of the horizontal elastic bundle, therefore it is possible to insert an atypical stiffener without shaking at the time of mass production of the injection molding products.

The present invention is for providing an injection molding apparatus configured for inserting atypical stiffener in which elastic pins and springs and wrench bolts are used at all times in a fixed bundle to assure the ease of assembly through easy embedding into the under core, and, the elasticity of the spring supported by the wrench bolt coupled with the screw groove of the wide tunnel, and the elastic pins are fixed to the stopper by the limiting jaw so that the side surface of the atypical stiffener is flexibly pressurized, therefore, it is possible to ensure the smooth adhesion according to the size of the atypical stiffener.

The present invention is for providing an injection molding apparatus configured for inserting atypical stiffener in which the narrow rod and wide rod of the vertical supporter are inserted into the narrow vertical grooves and the wide vertical grooves of the fixed bundle, and the fixing pin is inserted into the internal horizontal hole via the external horizontal hole in a state where the support step is in contact with the fixing step, and the horizontal elasticity bundle is easily embedded in the under core, therefore ensuring robust assembly.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 4B is a perspective view showing a pair of under cores and an elastic clamper in a state in which an under mold is dismantled to explain an injection molding apparatus configured for inserting atypical stiffener according to an exemplary embodiment of the present invention.

FIG. 4C is a perspective view exemplarily illustrating a pair of under cores and elastic clamper for explaining an injection molding apparatus configured for inserting atypical stiffener according to an exemplary embodiment of the present invention.

Figure 1A:
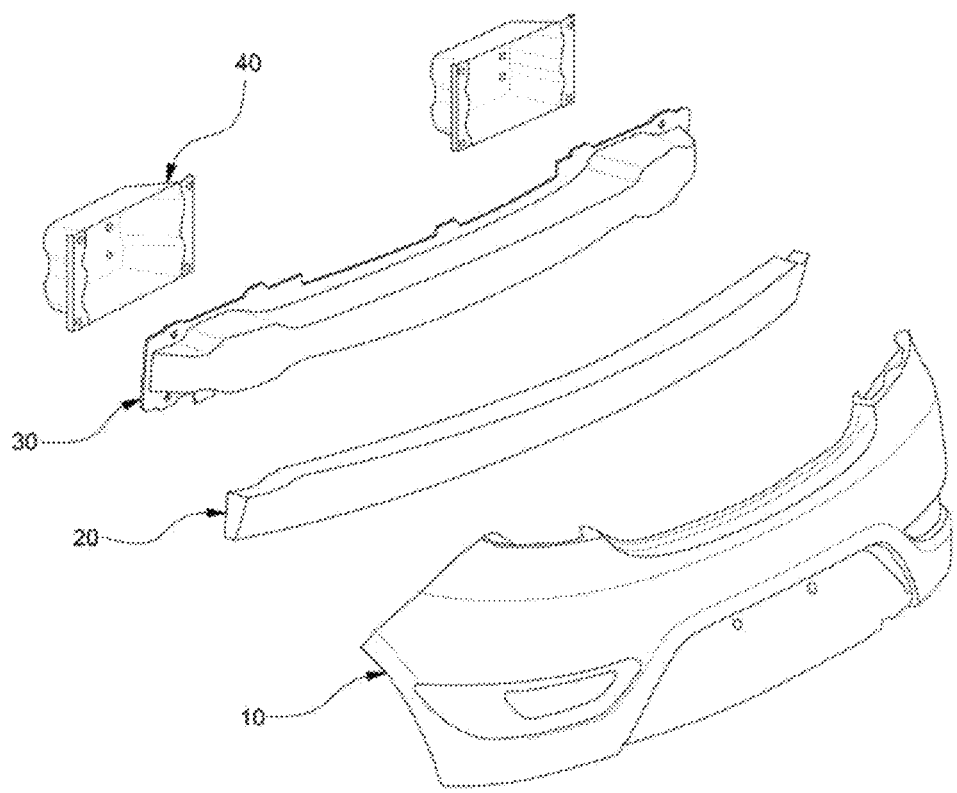
FIG. 1A is an exploded perspective view showing a configuration of a conventional automotive bumper assembly introduced in the conventional art.
Figure 1B:
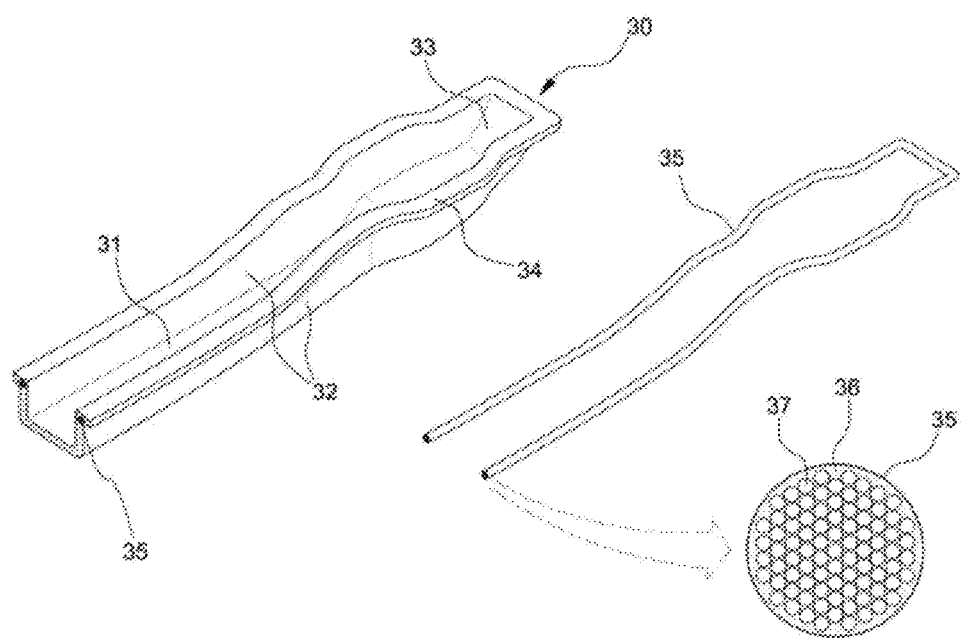
FIG. 1B is a perspective view showing a plastic composite material bumper beam for a vehicle according to the conventional art.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

An exemplary embodiment of an injection molding apparatus configured for inserting atypical stiffener according to an exemplary embodiment of the present invention will be described with reference to the drawings. A plurality of such embodiments may exist, and the objects, features, and advantages of the present invention may be better understood through these embodiments.

Figure 2A:
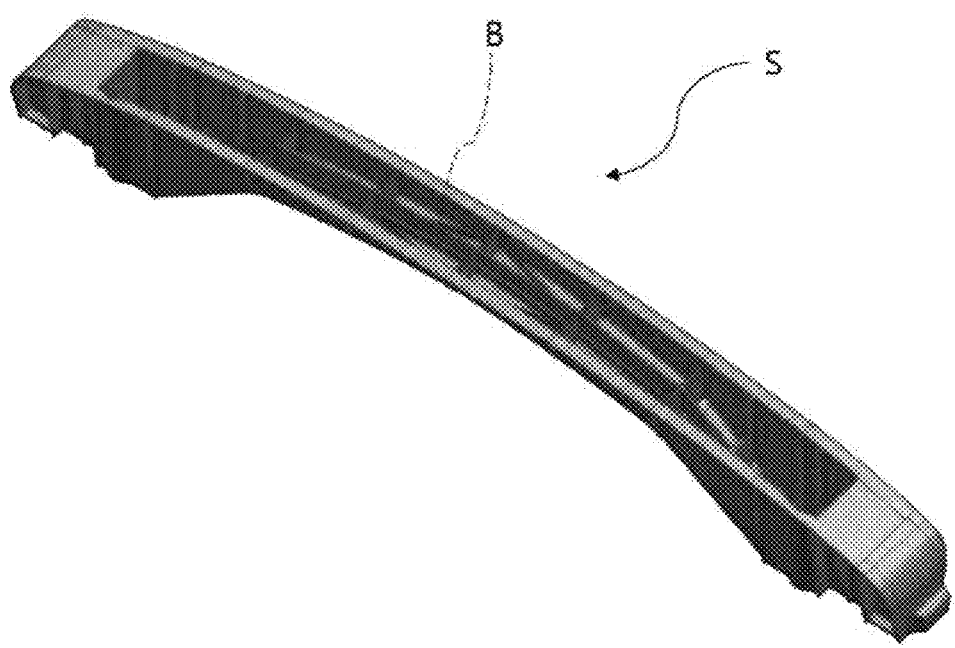
FIG. 2A is a perspective view showing a bumper beam used in a vehicle as an example of an injection molding product for explaining an injection molding apparatus configured for inserting atypical stiffener according to an exemplary embodiment of the present invention.
Figure 2B:
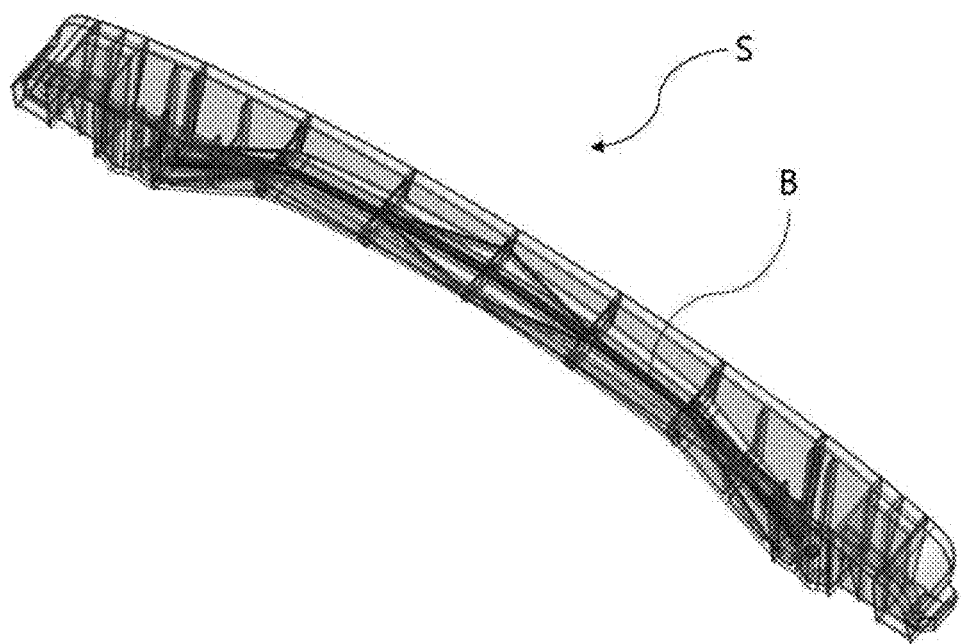
FIG. 2B is a perspective view showing a bumper beam used in a vehicle as an example of an injection molding product for explaining an injection molding apparatus configured for inserting atypical stiffener according to an exemplary embodiment of the present invention.

FIG. 2A is a perspective view showing a bumper beam used in a vehicle as an example of an injection molding product S for explaining an injection molding apparatus configured for inserting atypical stiffener according to an exemplary embodiment of the present invention, and FIG. 2B is a perspective view showing a bumper beam used in a vehicle as an example of an injection molding product S for explaining an injection molding apparatus configured for inserting atypical stiffener according to an exemplary embodiment of the present invention.

As shown in FIG. 2A and FIG. 2B, for example, an injection molding product S as a bumper beam to be used in vehicles is produced by molding a synthetic resin melt mixed and melted with a thermoplastic resin, a thermosetting resin, a binder, or the like into a mold, that is, an upper mold M1 and an under mold M2 and curing. At the instant time, it is possible to insert the atypical stiffener B by inserting it so that it can withstand the external impact (for preventing damage).

The atypical stiffener B may be made of a fiber reinforced plastic composite material having high rigidity, glass fiber, natural fiber, carbon fiber, aramid fiber, ultra high molecular weight polyethylene Fiber (UHMWPE Fiber), however, it is extremely difficult to hold the mold in the upper mold M1 and the under mold M2 at the time of injection molding because the size of its volume or external diameter is not fixed (because the atypical stiffener is made by weave, twist, or braid).

Figure 3A:
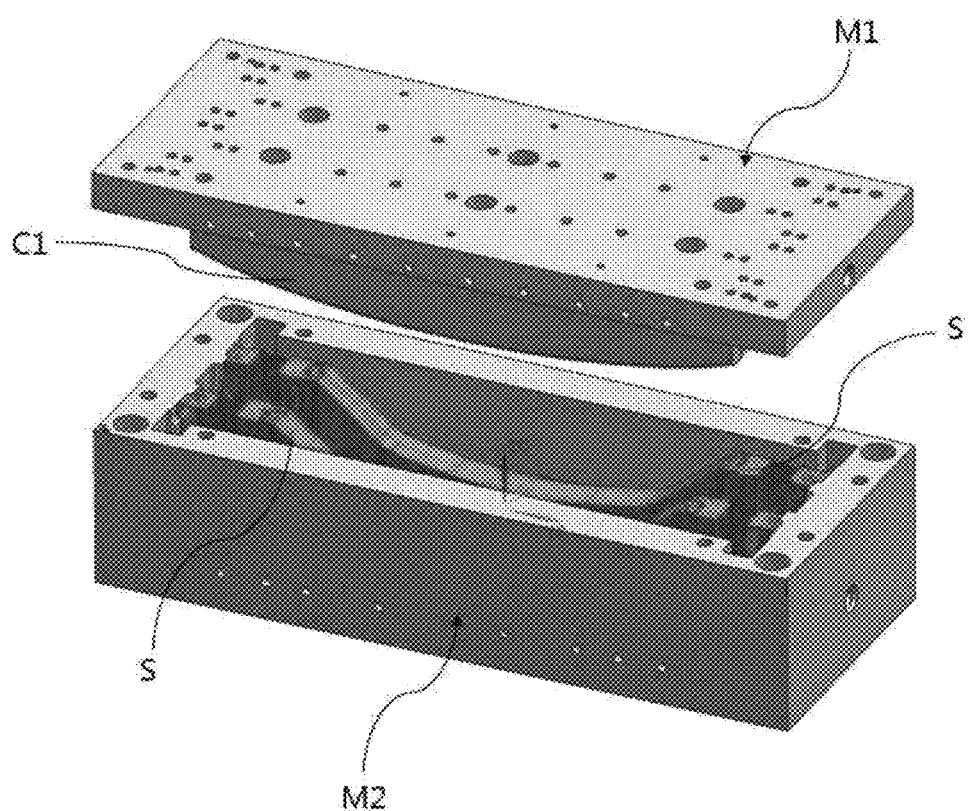
FIG. 3A and FIG. 3B are exploded perspective views of an injection molding apparatus configured for inserting atypical stiffener according to an exemplary embodiment of the present invention, including an injection molding product viewed from above.
Figure 3B:
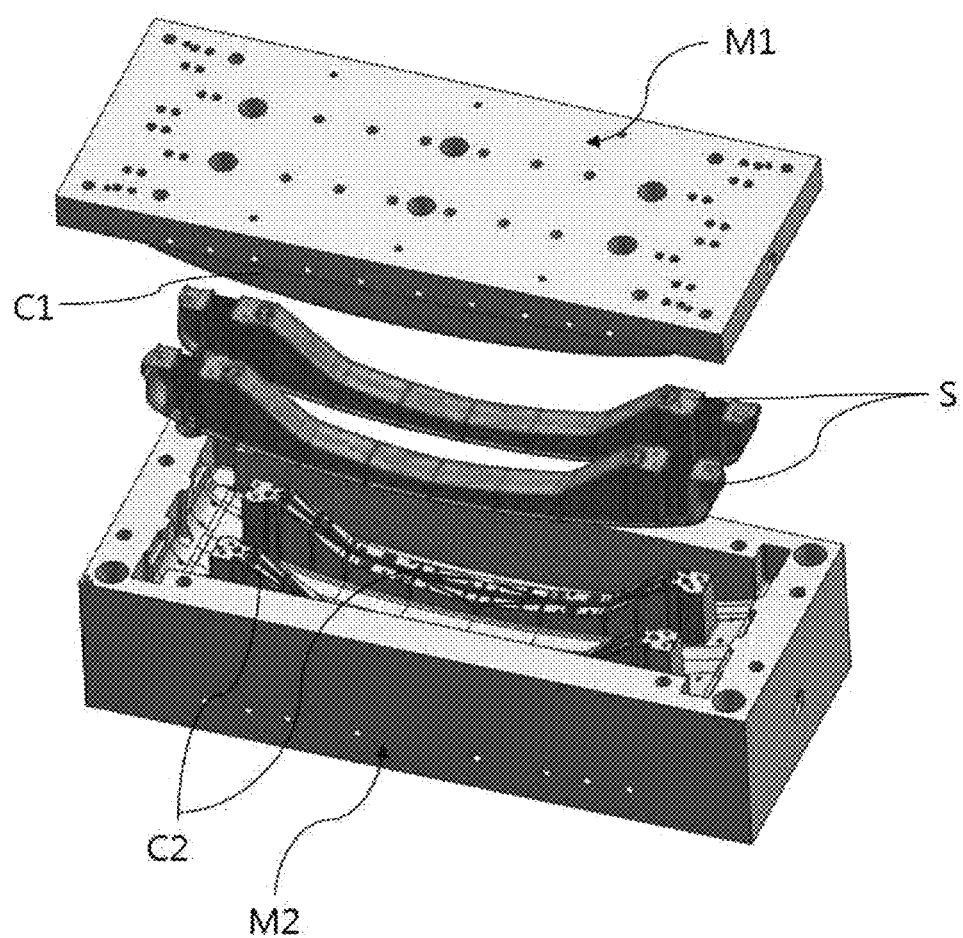
Figure 3C:
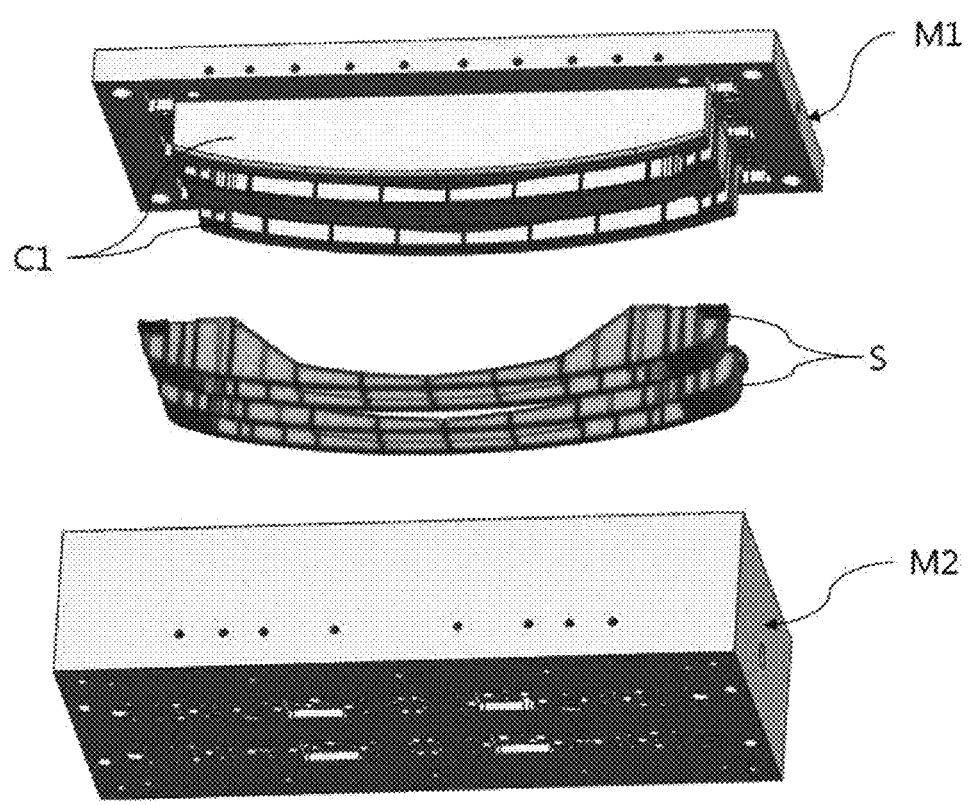
FIG. 3C is an exploded perspective view of an injection molding apparatus configured for inserting atypical stiffener according to an exemplary embodiment of the present invention including an injection molding product viewed from below.

FIG. 3A and FIG. 3B are exploded perspective views of an injection molding apparatus configured for inserting atypical stiffener according to an exemplary embodiment of the present invention, including an injection molding product viewed from above, and FIG. 3C is an exploded perspective view of an injection molding apparatus configured for inserting atypical stiffener according to an exemplary embodiment of the present invention including an injection molding product viewed from below.

As shown in FIG. 2A to FIG. 3C, an injection molding apparatus configured for inserting atypical stiffener according to an exemplary embodiment of the present invention includes an upper mold M1 provided with an upper core C1 and an under mold M2 provided with an under core C2 for manufacturing an injection molding product S by receiving synthetic resin melt and curing in a state in which an atypical stiffener B whose size is not constant is inserted.

When the injection molding product S is produced, for example, when manufacturing a bumper beam of a vehicle, the upper core C1 and the under core C2 are combined in a male and female engagement with a gap and a gap in the upper mold M1 and the under mold allow them to enter along clearances and crevices, therefore, as shown in FIG. 2A and FIG. 2B, it is possible to fabricate a structure in which the weight is reduced and the strength is strengthened by having a plate shape and a flesh or a rib as a whole.

Like this, even if an injection molding product S having a plate shape and having flesh or ribs is damaged, it may be easily broken if an external impact is applied. In the case of manufacturing a bumper beam for a vehicle, an atypical stiffener B is inserted to reinforce the strength. The atypical stiffener B is not easily fixed in the upper and lower molds M1 and M2 during injection molding as described above.

Figure 4A:
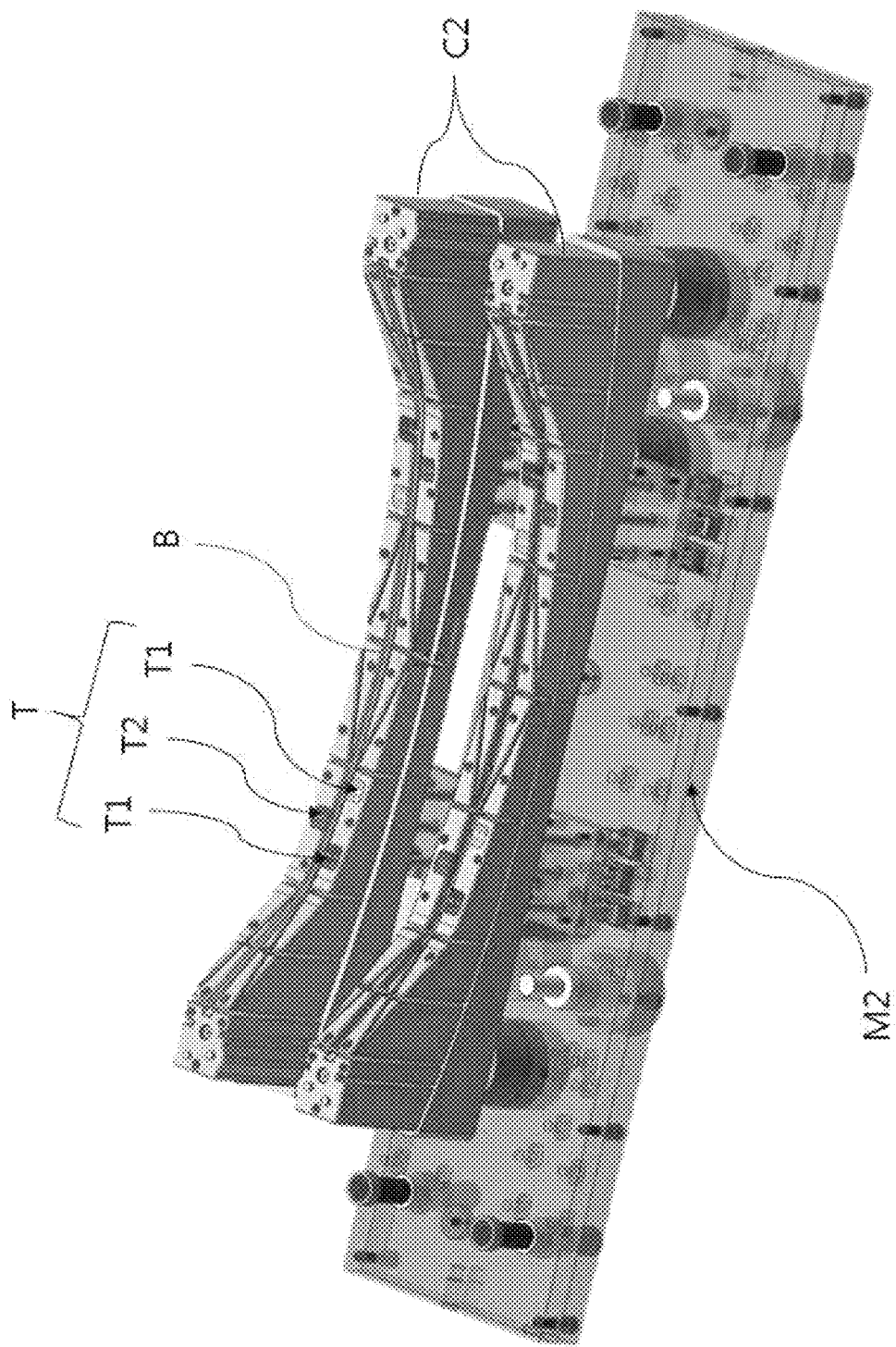
FIG. 4A is a perspective view showing a pair of under cores in a state in which an under mold is dismantled to explain an injection molding apparatus configured for inserting atypical stiffener according to an exemplary embodiment of the present invention.
Figure 4D:
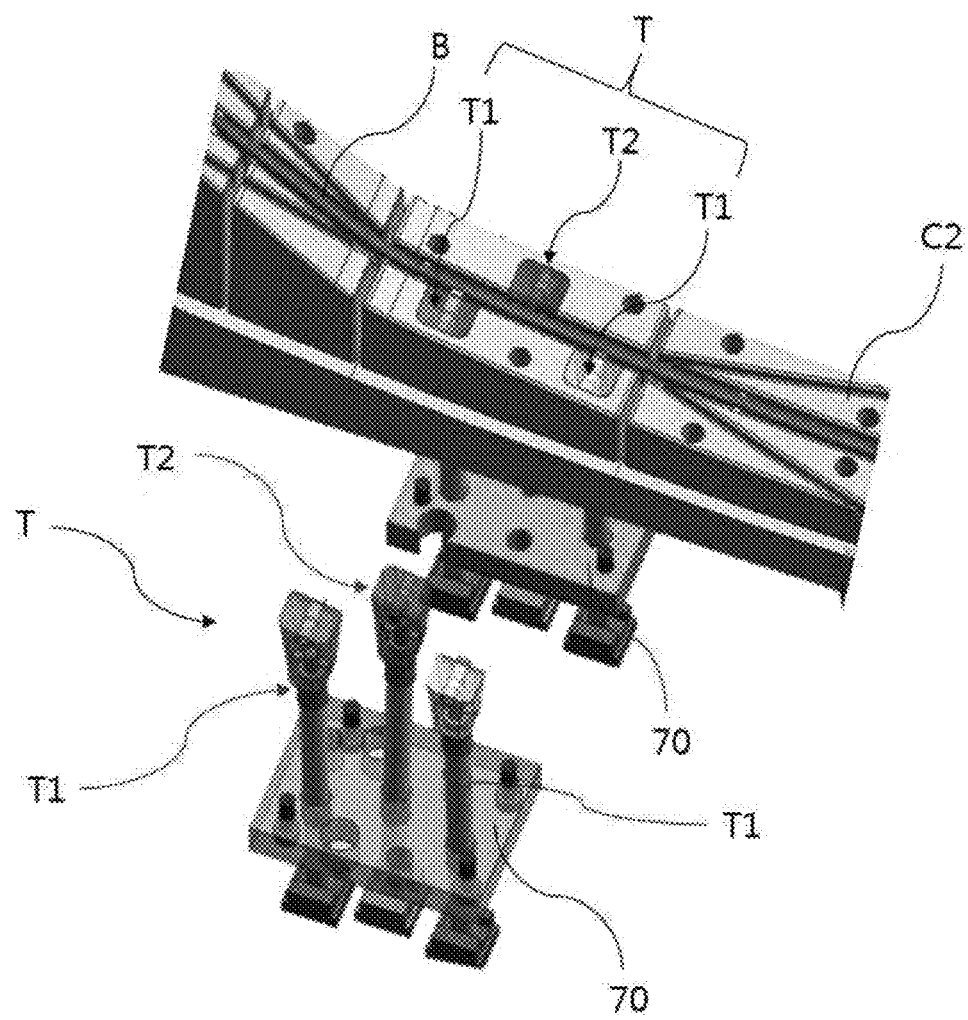
FIG. 4D is a partially enlarged perspective view of an under core and an elastic clamper for explaining an injection molding apparatus configured for inserting atypical stiffener according to an exemplary embodiment of the present invention.

FIG. 4A is a perspective view showing a pair of under cores in a state in which an under mold is dismantled to explain an injection molding apparatus configured for inserting atypical stiffener according to an exemplary embodiment of the present invention, FIG. 4B is a perspective view showing a pair of under cores and an elastic clamper in a state in which an under mold is dismantled to explain an injection molding apparatus configured for inserting atypical stiffener according to an exemplary embodiment of the present invention, FIG. 4C is a perspective view exemplarily illustrating a pair of under cores and elastic clamper for explaining an injection molding apparatus configured for inserting atypical stiffener according to an exemplary embodiment of the present invention, and FIG. 4D is a partially enlarged perspective view of an under core and an elastic clamper for explaining an injection molding apparatus configured for inserting atypical stiffener according to an exemplary embodiment of the present invention.

As shown in FIG. 2A to FIG. 4D, the injection molding apparatus configured for inserting atypical stiffener according to an exemplary embodiment of the present invention includes elastic clampers T supported by the under mold M2, embedded in the under core C2, interlocked with the size of the atypical stiffener B, and elastically pressurizing both sides to hold the atypical stiffener B to be inserted into a correct position between the upper core C1 and the under core C2 by the atypical stiffener B when the synthetic resin melt is introduced.

In the injection molding apparatus configured for inserting atypical stiffener according to an exemplary embodiment of the present invention, an elastic clamper T presses elastically both sides of the atypical stiffener B in association with the size of an atypical stiffener B to hold it in position between an upper core C1 and an under core C2 (if the size is large, it retreats backward by elasticity, and if the size is small, it moves forward), and therefore, the injection molding product S may be manufactured in large quantities without defects.

Figure 5A:
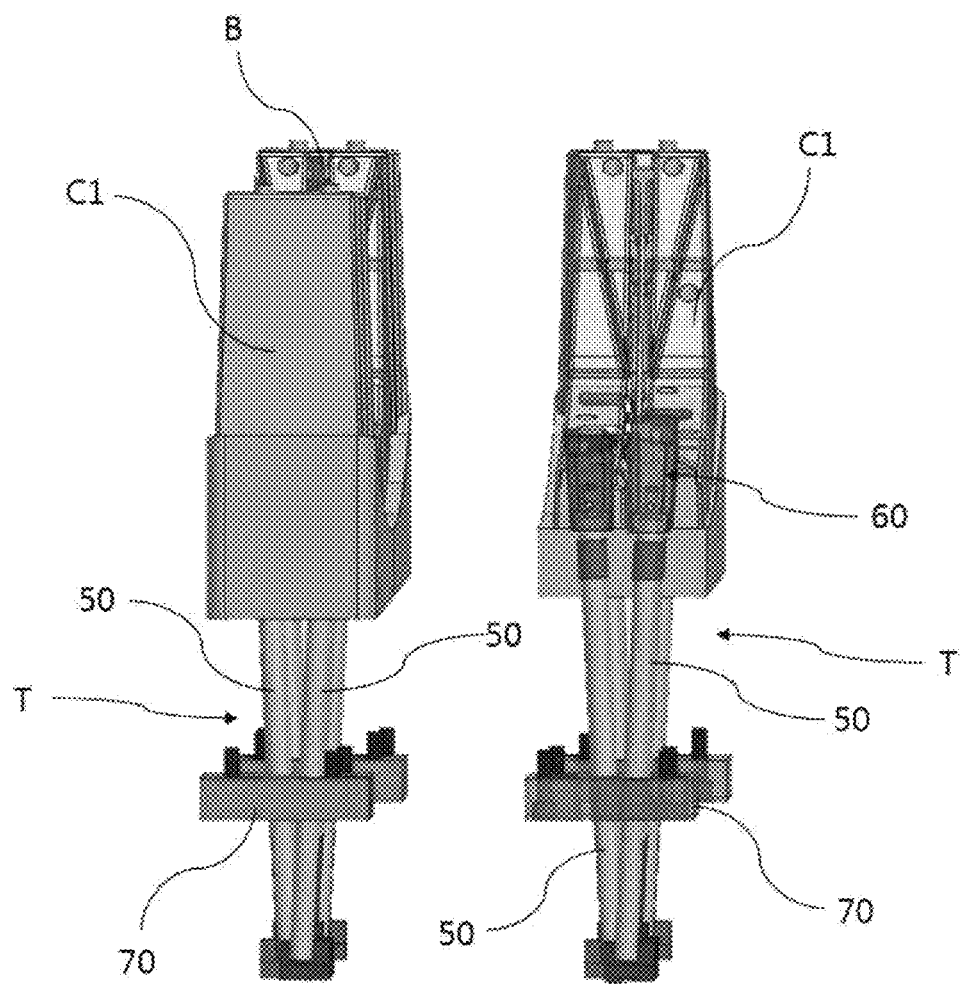
FIG. 5A is a side view of a pair of under cores and elastic clamper for explaining an injection molding apparatus configured for inserting atypical stiffener according to an exemplary embodiment of the present invention.
Figure 5B:
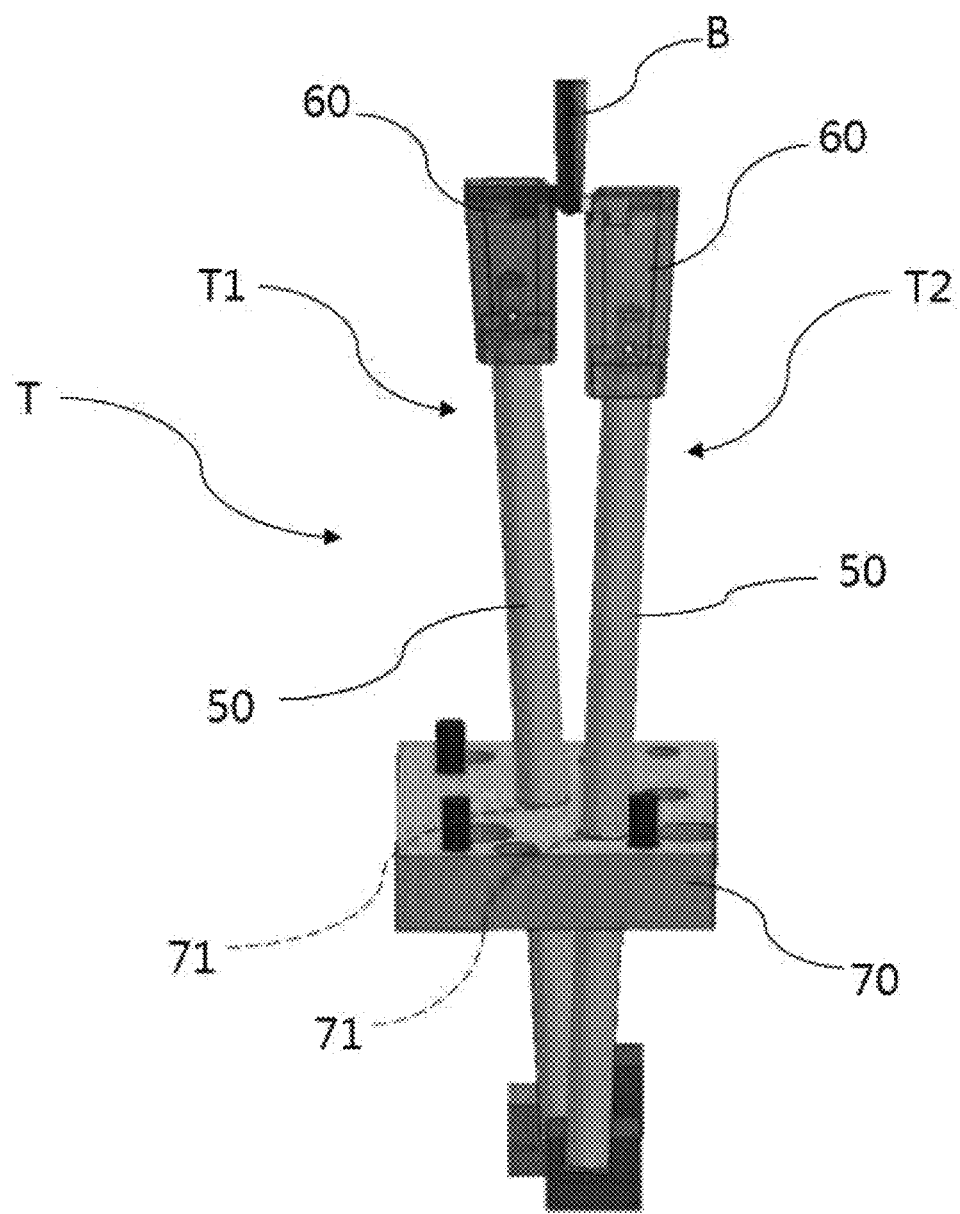
FIG. 5B is a perspective view of an elastic clamper and a tilt bracket viewed from the side to explain an injection molding apparatus configured for inserting atypical stiffener according to an exemplary embodiment of the present invention.
Figure 5C:
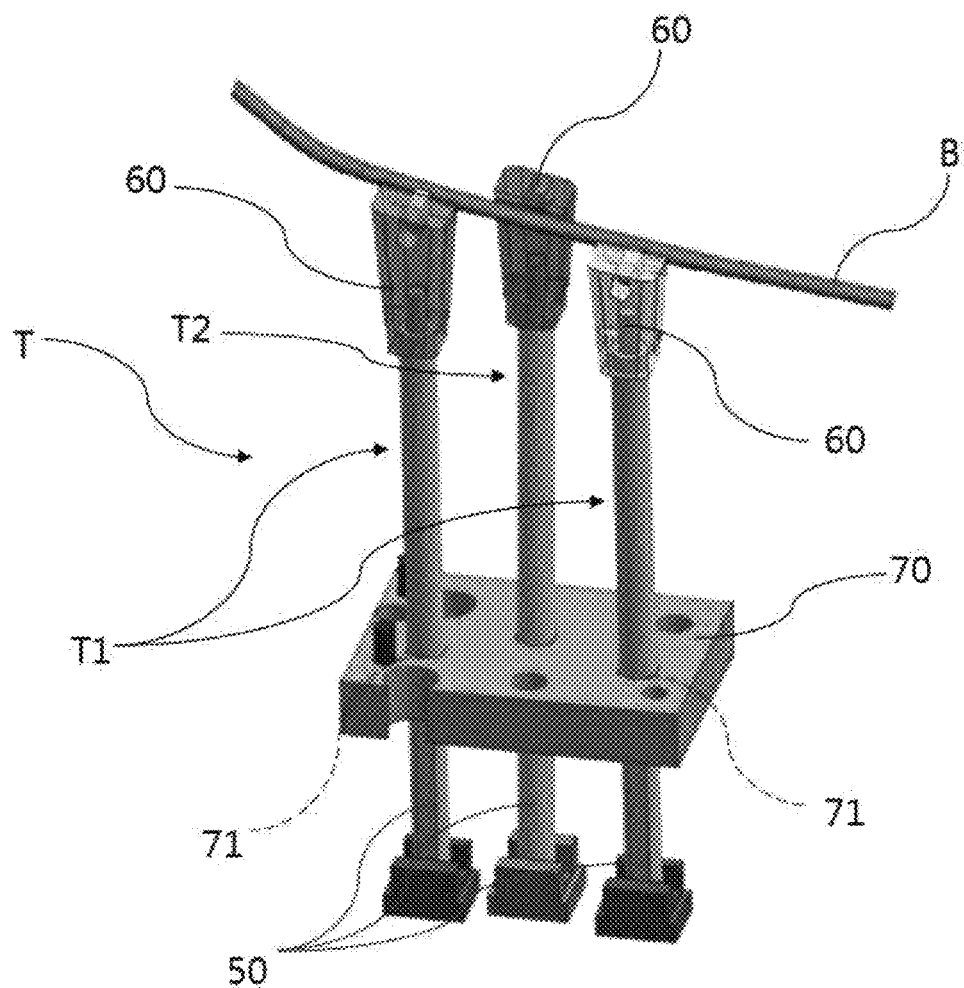
FIG. 5C is a perspective view exemplarily illustrating an elastic clamper and a tilt bracket holding an irregular reinforcing member to explain an injection molding apparatus configured for inserting atypical stiffener according to an exemplary embodiment of the present invention.

FIG. 5A is a side view of a pair of under cores and elastic clamper device for explaining an injection molding apparatus configured for inserting atypical stiffener according to an exemplary embodiment of the present invention, FIG. 5B is a perspective view of an elastic clamper device and an tilt bracket viewed from the side to explain an injection molding apparatus configured for inserting atypical stiffener according to an exemplary embodiment of the present invention, and FIG. 5C is a perspective view exemplarily illustrating an elastic clamper and a tilt bracket holding an irregular reinforcement member to explain an injection molding apparatus configured for inserting atypical stiffener according to an exemplary embodiment of the present invention.

As shown in FIG. 2A to FIG. 5C, the elastic clamper device T applied to the injection molding apparatus configured for inserting atypical stiffener according to an exemplary embodiment of the present invention includes a side elastic clamper T1 and the other side elastic clamper T2 elastically pressing both sides of the atypical stiffener B therebetween.

The present invention is for securely and accurately holding correct position of the atypical stiffener inserted into the injection molding product by elastically pressing the atypical stiffener by one side elastic clamper and the other side elastic clamper from both sides even if the size of the atypical stiffener is different (even if the size of the atypical stiffener is uneven), and therefore, the injection molding product S may be manufactured in large quantities without defects. At the instant time, the one side elastic clamper T1 and the other side elastic clamper T2 may be disposed one to one with the atypical stiffener B therebetween, they may be disposed to face each other while facing each other, or may be disposed to be opposed to each other as shown in FIG. 5C.

Figure 6A:
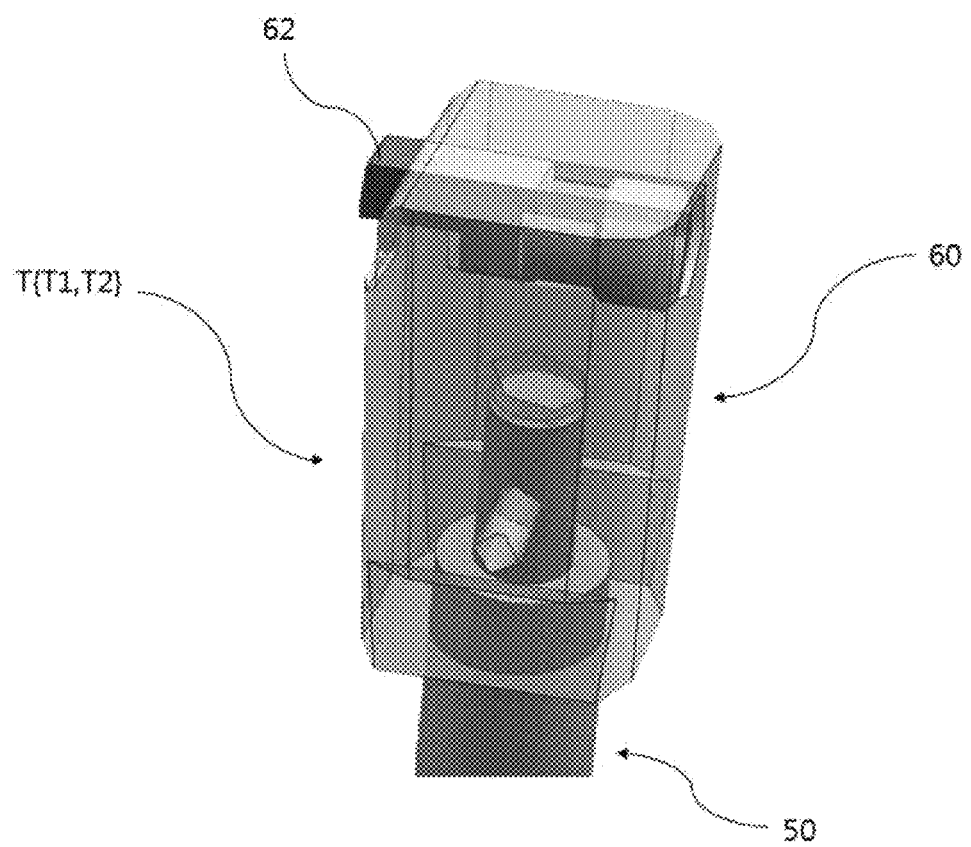
FIG. 6A is a perspective view exemplarily illustrating a vertical supporter and a horizontal elastic bundle forming one side elastic clamper and the other side elastic clamper applied to an injection molding apparatus configured for inserting atypical stiffener according to an exemplary embodiment of the present invention.
Figure 6B:
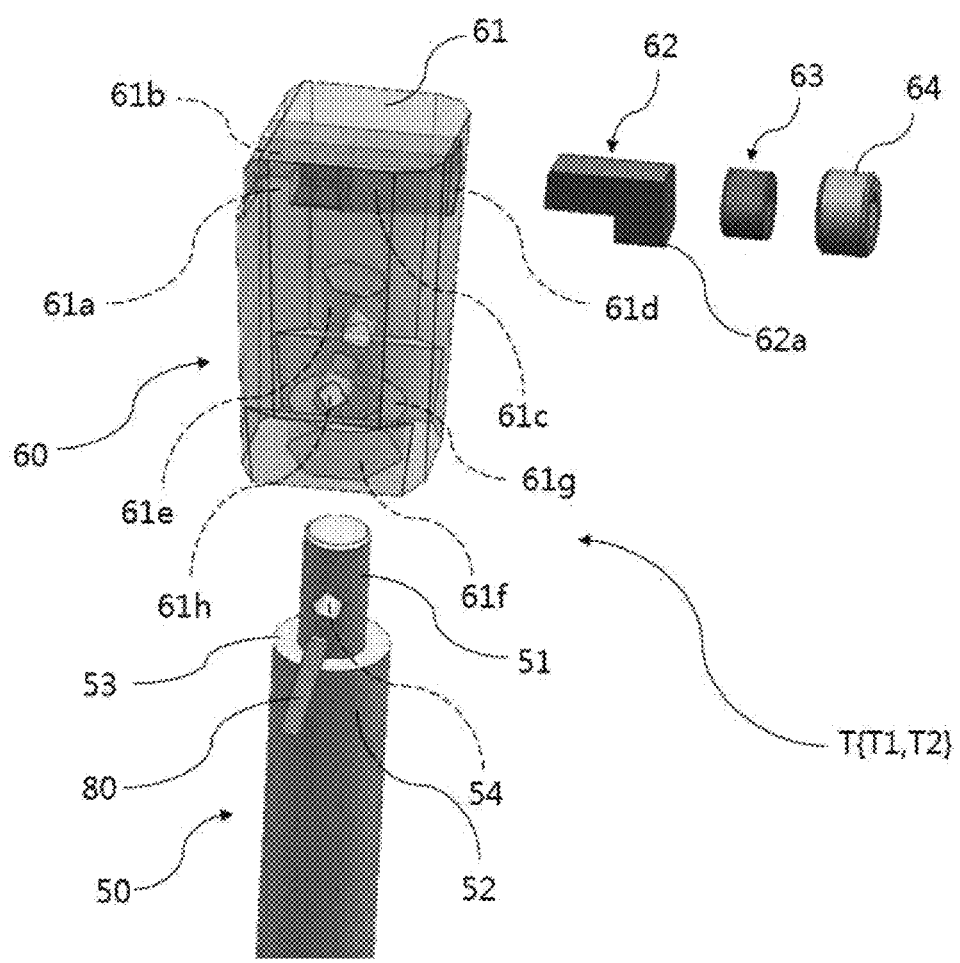
FIG. 6B is an exploded perspective view exemplarily illustrating a vertical supporter and a horizontal elastic bundle forming one side elastic clamper and the other side elastic clamper applied to an injection molding apparatus configured for inserting atypical stiffener according to an exemplary embodiment of the present invention.

FIG. 6A is a perspective view exemplarily illustrating a vertical supporter 50 and a horizontal elastic bundle 60 forming one side elastic clamper T1 and the other side elastic clamper T2 applied to an injection molding apparatus configured for inserting atypical stiffener according to an exemplary embodiment of the present invention, and FIG. 6B is an exploded perspective view exemplarily illustrating a vertical supporter 50 and a horizontal elastic bundle 60 forming one side elastic clamper T1 and the other side elastic clamper T2 applied to an injection molding apparatus configured for inserting atypical stiffener according to an exemplary embodiment of the present invention.

The one side elastic clamper T1 and the other side elastic clamper T2 applied to the injection molding apparatus configured for inserting atypical stiffener includes a vertical supporter 50 mounted and erected on the under mold M2, respectively, and a horizontal elastic bundle 60 mounted on the upper end portion of the vertical supporter 50 and embedded in the under core C2 to elastically pressurize both sides of the atypical stiffener B therebetween.

The present invention is for providing an injection molding apparatus configured for inserting atypical stiffener in which the vertical supporter 50 and the horizontal elasticity bundle 60 are mounted to make under mold M2 and under core C2 embedding easier when the one side elastic clamper T1 and the other side elastic clamper T2 are provided, a horizontal elastic bundle 60 is mounted to the upper end portion of the vertical supporter 50 while being supported by the under mold M2.

Furthermore, the vertical supporter 50 of the one side elastic clamper T1 and the vertical supporter 50 of the other side elastic clamper T2 are erected at a slope away from the lower end portion of the under mold M2 toward the upper end portion thereof so that the horizontal elastic bundle 60 of the one side elastic clamper T1 and the horizontal elastic bundle 60 of the other side elastic clamper T2 can elastically pressurize the atypical stiffener B therebetween in upper wide and lower narrow clearances when inserting into the under core C2.

In an exemplary embodiment of the present invention, the horizontal elasticity bundle 60 of the one side elastic clamper T1 and the horizontal elasticity bundle 60 of the other side elastic clamper T2 can elastically press at the upper wide and the under narrow clearances on both sides of the atypical stiffener B, whereby the synthetic resin melt is cured in the under mold M2 and the upper mold M1, therefore it may be rapidly separated from the horizontal elastic bundle 60 on both sides when it is removed in the upward direction thereof.

Furthermore, the elastic clamper device T further include a tilt bracket 70 connected at a middle end portion of the under mold M2 and including inclination holes 71 which are obliquely drilled at an angle such which is close at a lower portion and remote at an upper portion, and the vertical supporter 50 of the one side elastic clamper T1 and the vertical supporter 50 of the other side elastic clamper T2 are fixed close to the lower end portion of the under mold M2, and then are inserted into the inclination holes 71 and are inclined at mutually different distances toward the upper end portion of the under mold M2.

In an exemplary embodiment of the present invention, the vertical supporters 50 of the one side elastic clamper T1 and the other side elastic clamper T2 are fixed close to the lower end portion of the under mold M2, respectively, and then are inserted into the inclination holes 71 of the tilt bracket 70 and are inclined at mutually different distances toward the upper end portion of the under mold M2, enables rigid support of the horizontal elastic bundle 60, therefore it is possible to insert an atypical stiffener B without shaking at the time of mass production of the injection molding products S.

The horizontal elastic bundle 60 of the one side elastic clamper T1 and the other side elastic clamper T2 includes a fixed bundle 61 including a wide tunnel 61c fixed at the upper end portion of the vertical supporter 60 and including a narrow tunnel 61b and a screw groove 61d having a stopper 61a toward the atypical stiffener B and embedded in the under core C2, an elastic pin 62 moving back and forth along the wide tunnel 61c and including a limiting jaw 62a covering the stopper 61a, and elastically pressing the side of the atypical stiffener B interlocked with the size of the atypical stiffener B via the narrow tunnel 61b, a spring 63 inserted into the wide tunnel 61c and elastically pushing the elastic pin 62, and a wrench bolt 64 screwed to the screw groove 61d to support the spring 63.

In an exemplary embodiment of the present invention, elastic pins 62 and springs 63 and wrench bolts 64 are used at all times in a fixed bundle 61 to assure the ease of assembly through easy embedding into the under core C2, and, the elasticity of the spring 63 supported by the wrench bolt 64 coupled with the screw groove 61d of the wide tunnel 61c, and the elastic pins 62 are fixed to the stopper 61a by the limiting jaw 62a so that the side surface of the atypical stiffener B is flexibly pressurized, therefore, it is possible to ensure the smooth adhesion according to the size of the atypical stiffener B.

Furthermore, the fixed bundle 61 includes a narrow vertical groove 61e formed in the lower portion in the vertical direction and a fixing step 61g formed by a wide vertical groove 61f, and includes an external horizontal hole 61h toward the narrow vertical groove 61e, the vertical supporter 50 includes a narrow rod 51 conformed to the fixing step 61g formed by the narrow vertical groove 61e and the wide vertical groove 61f and a support step 53 by the wide rod 52, and includes an internal horizontal hole 54 matched with the external horizontal hole 61h, and a fixing pin 80 is fitted in the internal horizontal hole 54 via the external horizontal hole 61h.

In an exemplary embodiment of the present invention, the narrow rod 51 and wide rod 52 of the vertical supporter 50 are inserted into the narrow vertical grooves 61e and the wide vertical grooves 61f of the fixed bundle 61, and the fixing pin 80 is inserted into the internal horizontal hole 54 via the external horizontal hole 61h in a state where the support step 53 is in contact with the fixing step 61g, and the horizontal elasticity bundle 60 is easily embedded in the under core C2, therefore ensuring robust assembly.

Like this, in the injection molding apparatus configured for inserting atypical stiffener according to an exemplary embodiment of the present invention, an elastic clamper device T presses elastically both sides of the atypical stiffener B in association with the size of an atypical stiffener B to hold it in position between an upper core C1 and an under core C2 (if the size is large, it retreats backward by elasticity, and if the size is small, it moves forward), and therefore, the injection molding product S may be manufactured in large quantities without defects.

The present invention may be applied to an industrial field in which an injection molding product is produced by injecting a melt of a synthetic resin mixed and melted with a thermoplastic resin, a thermosetting resin, a binder, etc. Into a mold.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An injection molding apparatus for inserting a stiffener including an upper mold provided with an upper core and an under mold provided with an under core for manufacturing an injection molding product by receiving synthetic resin melt and curing in a state in which the stiffener whose size is not constant is inserted, the injection molding apparatus comprising:
   an elastic clamper device supported by the under mold, embedded in the under core, interlocked with a size of the stiffener, and elastically pressurizing a first side and a second side of the stiffener to hold the stiffener to be inserted into a predetermined position between the upper core and the under core by the elastic clamper device when the synthetic resin melt is introduced,
   wherein the elastic clamper device includes a first side elastic clamper elastically pressing the first side of the stiffener and a second side elastic clamper elastically pressing the second side of the stiffener to elastically press the stiffener between the first side elastic clamper and the second side elastic clamper, wherein each of the first side elastic clamper and the second side elastic clamper include:
a vertical supporter mounted and erected on the under mold; and
a horizontal elastic bundle mounted on an upper end portion of the vertical supporter and embedded in the under core to elastically pressurize the first side and the second side of the stiffener between the first side elastic clamper and the second side elastic clamper,
wherein each vertical supporter of the first side elastic clamper and the second side elastic clamper is erected to be inclined from a lower end portion of the under mold toward an upper end portion of the under mold so that the horizontal elastic bundle of the first side elastic clamper and the horizontal elastic bundle of the second side elastic clamper are configured to elastically pressurize the stiffener by the first side elastic clamper and the second side elastic clamper while the horizontal elastic bundle of the first side elastic clamper and the horizontal elastic bundle of the second side elastic clamper are in the under core, and
wherein the elastic clamper device further include a tilt bracket connected at a middle end portion of the under mold and including inclination holes which are obliquely formed at a predetermined angle such that the inclination holes are close at lower portions of the inclination holes each other and remote at upper portions of the inclination holes each other.

2. The injection molding apparatus for inserting the stiffener of claim 1,
wherein the vertical supporter of the first side elastic clamper and the vertical supporter of the second side elastic clamper are fixed adjacent to the lower end portion of the under mold, and then are inserted into the inclination holes and are inclined at mutually different distances between the inclination holes toward the upper end portion of the under mold.

3. The injection molding apparatus for inserting the stiffener of claim 1, wherein each horizontal elastic bundle of the first side elastic clamper and the second side elastic clamper includes:
a fixed bundle embedded in the under core and including:
a first tunnel fixed at the upper end portion of the vertical supporter;
a second tunnel connected to a first side of the first tunnel; and
a screw groove connected to a second side of the first tunnel; and
a stopper formed between the second tunnel and the first tunnel toward the stiffener,
an elastic pin slidably mounted in the first tunnel and moving back and forth along the first tunnel and including a limiting jaw covering the stopper, and elastically pressing a side of the stiffener interlocked with the size of the stiffener via the second tunnel,
an elastic member inserted into the first tunnel and elastically pushing the elastic pin, and
a wrench bolt screwed to a portion of the screw groove to support the elastic member.

4. The injection molding apparatus for inserting the stiffener of claim 3,
wherein the fixed bundle further includes:
a first vertical groove formed in a lower portion of each horizontal elastic bundle in a vertical direction of each horizontal elastic bundle; and
a fixing step formed by a second vertical groove; and
an external horizontal hole formed toward the first vertical groove,
wherein the vertical supporter includes:
a first rod conformed to the fixing step formed by the first vertical groove and the second vertical groove;
a support step formed between the first rod and a second rod; and
an internal horizontal hole matched with the external horizontal hole, and
wherein a fixing pin is fitted in the internal horizontal hole via the external horizontal hole.

\* \* \* \* \*